United States Patent [19]
Hahn et al.

[11] Patent Number: 6,077,802
[45] Date of Patent: Jun. 20, 2000

[54] MICROWAVE DIELECTRIC CERAMIC COMPOSITION

[75] Inventors: Jin Woo Hahn; Duk Jun Kim; Gee Pyeong Han; Yark Yeon Kim; Sang Seok Lee; Tae Goo Choy, all of Daejeon, Rep. of Korea

[73] Assignees: Electronics and Telecommunications Research Institute, Daejon; Korea Telecom, Seoul, both of Rep. of Korea

[21] Appl. No.: 09/186,900

[22] Filed: Nov. 6, 1998

[30] Foreign Application Priority Data

Sep. 10, 1998 [KR] Rep. of Korea ................. 98-37412

[51] Int. Cl.[7] ................................. C04B 35/457
[52] U.S. Cl. ...................... 501/134; 501/136; 501/137
[58] Field of Search ................... 501/134, 135, 501/136, 137

[56] References Cited

U.S. PATENT DOCUMENTS

| | | |
|---|---|---|
| 4,102,696 | 7/1978 | Katsube et al. . |
| 4,665,041 | 5/1987 | Higuchi et al. . |
| 5,132,258 | 7/1992 | Takahashi et al. . |
| 5,700,745 | 12/1997 | Okuyama et al. ............... 501/135 |
| 5,843,860 | 12/1998 | Kim et al. ....................... 501/134 |
| 5,912,797 | 6/1999 | Schneemeyer et al. ......... 501/134 |

FOREIGN PATENT DOCUMENTS

| | | |
|---|---|---|
| 404106807 | 4/1992 | Japan . |
| 404272609 | 9/1992 | Japan . |
| 404357610 | 12/1992 | Japan . |
| 404357613 | 12/1992 | Japan . |
| 406215626 | 8/1994 | Japan . |

OTHER PUBLICATIONS

Gisbert Wolfram et al., "Existence Range, Structural and Dielectric Properties of $Zr_xTi_ySn_zO_4$ Ceramics (x+y+z=2)", Mat. Res. Bull., vol. 16, Sep. 1981 Pergamon Press Ltd., pp. 1455–1463.

K. Wakino et al., "Microwave Characteristics of (Zr, Sn)$TiO_4$ and BaO–PbO–$Nd_2O_3$–$TiO_2$ Dielectric Resonators", Journal of the American Ceramic Society, vol. 67, No. 4 pp. 278–281 (Jul. 1983).

Shin–ichi Hirano et al., "Chemical Processing and Microwave Characteristics of (Zr, Sn) $TiO_4$ Microwave Dielectrics", Journal of the American Ceramic Society, vol. 74, No. 6, pp. 1320–1324 (Aug. 1984).

*Primary Examiner*—Karl Group
*Attorney, Agent, or Firm*—Jacobson, Price, Holman & Stern, PLLC

[57] ABSTRACT

A microwave dielectric ceramic composition is fabricated by adding one selected from a material containing Ba and a material containing Sr or a mixture of a material containing Ba and a material containing Sr to a composition formed of 25~43 wt % of $TiO_2$, 39–57 wt % of $ZrO_2$, and 7–28 wt % of $SnO_2$ as an additive, wherein the additive is added by 0.2~8.0 wt % based on the total amount of the composition, and is capable of implementing a high dielectric constant and quality factor by sintering at a temperature of 1250~1400° C.

2 Claims, 1 Drawing Sheet

MICROWAVE DIELECTRIC CERAMIC COMPOSITION

BACKGROUND OF THE INVENTION

1. Field of the Invention

The present invention relates to a microwave dielectric ceramic composition, and in particular, to an improved microwave dielectric ceramic composition which is applicable as an antenna or microwave circuit used in a band pass filter or a microwave region based on a high dielectric constant $\epsilon_r$ and quality factor Q and by controlling a temperature coefficient of a resonant frequency $\tau_f$.

2. Description of the Conventional Art

Recently, since a communication unit such as a vehicle-mounted telephone, a cellular phone, a codeless phone, a satellite broadcast receiver, etc. is widely used, the use of a dielectric ceramic is increased as an antenna or microwave circuit used in a band pass filter or a microwave region.

The dielectric ceramic has a high dielectric constant and quality factor and a temperature coefficient of a resonant frequency $\tau_f$ defined in a range of $-5$ ppm/° C.~$+5$ ppm/° C. In addition, the fabrication cost of the dielectric ceramic is needed to be preferably low. Among the dielectric ceramic compositions, $(Zr,Sn)TiO_4$ is known to have a dielectric constant of 38. In order to fabricate the $(Zr,Sn)TiO_4$ having a relative density of more than 90% based on a solid state reaction, a sintering temperature higher than 1600° C. is required. The above-described composition is disclosed in "Chemical Processing and Microwave Characteristics of $(Zr,Sn)TiO_4$ Microwave Dielectrics" J. Am. Ceram. Soc., 74 [6] 1320–1324 (1991) by Shinich Hirano, Takashi Hayashi, and Akiyoshi Hattori.

Therefore, in another article, an additive is disclosed, which is capable of decreasing the sintering temperature to lower than 1600° C. without decreasing the microwave dielectric characteristic of the $(Zr,Sn)TiO_4$ ceramic.

The U.S. Pat. No. 4,102,696 discloses a microwave dielectric ceramic composition in which 0.2~17 wt % of one selected from $La_2O_3$, CoO, and ZnO to the composition formed of 22~43 wt % of $TiO_2$, 38~58 wt % of $ZrO_2$ and 9~26 wt % of $SnO_2$. This composition is capable of decreasing the sintering temperature to 1320° C. by adding one of $La_2O_3$, CoO, and ZnO to the composition sintered at a temperature of 1600° C.

In addition, the U.S. Pat. No. 4,665,041 discloses a dielectric ceramic obtained by sintering a mixture powder at 1350~1450° C. which is obtained by adding one selected from ZnO less than 7 wt %, and NiO, $Nb_2O_5$, $Ta_2O_5$, $WO_3$, $Sb_2O_5$ less than 10 wt % to the composition formed of 22~43 wt % of $TiO_2$, 38~58 wt % of $ZrO_2$, and 9~26 wt % of $SnO_2$ by less than 7 wt %.

The U.S. Pat. No. 5,132,258 discloses ceramic sintered at a temperature of 1350~1450° C. by adding one selected from MnO, $Al_2O_3$, CuO and $Li_2O$, by 5 wt % to the composition formed of $xTiO_2$-$yZrO_2$-$zSnO_2$ wherein $0.30<x<0.60$, $0.25<y<0.60$, $0.025<z<0.20$, and $x+y+z=1$ based on the mole ratio or adding 3 wt % of $Ga_2O_3$ to the above-described composition or adding $Nb_2O_5$ or $Ta_2O_5$ by less than 10 wt % or adding ZnO by less than 5 wt %.

SUMMARY OF THE INVENTION

Accordingly, it is an object of the present invention to provide a microwave dielectric ceramic composition which overcomes the aforementioned problems encountered in the conventional art.

It is another object of the present invention to provide a microwave dielectric ceramic composition in which a temperature coefficient of a resonant frequency is easily controlled for thereby implementing a high dielectric constant and quality factor by sintering at a temperature of 1250~1400° C.

In order to achieve the above objects, there is provided a microwave dielectric ceramic composition which is fabricated by adding one selected from a material containing Ba and a material containing Sr or a mixture of a material containing Ba and a material containing Sr to a composition formed of 25~43 wt % of $TiO_2$, 39~57 wt % of $ZrO_2$, and 7~28 wt %, of $SnO_2$ as an additive, wherein the additive is added by 0.2~8.0 wt % based on the total amount of the composition.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
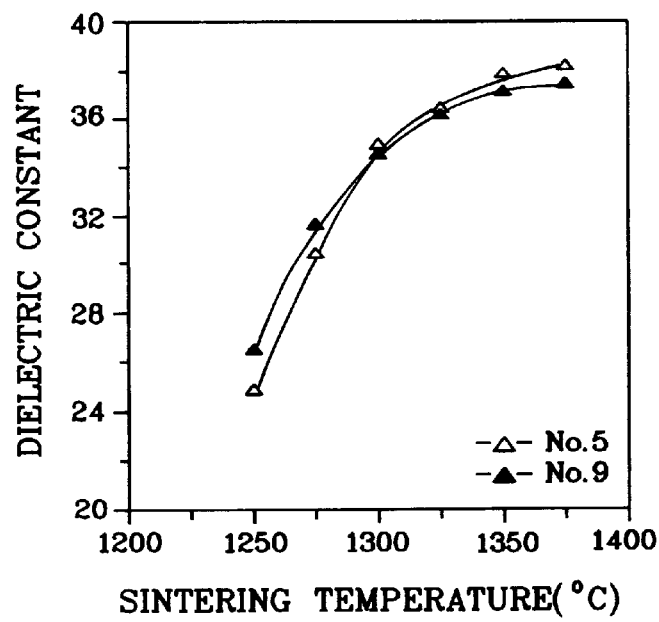
FIG. 1 is a graph illustrating a dielectric characteristic based on a sintering temperature with respect to a composition according to the present invention.

The dielectric ceramic composition according to the present invention is obtained by adding an additive to a composition formed of 25~43 wt % of $TiO_2$, 39~57 wt %, of $ZrO_2$, and 7~28 wt % of $SnO_2$ by 0.2~8.0 wt % using one selected from a material containing Ba and a material containing Sr or a mixture containing both Ba and Sr. In addition, in the present invention, the material containing Ba is formed like $BaCO_3$, $BaTiO_3$, and $BaZrO_3$, and the material containing Sr is formed like $SrCO_3$, $SrTiO_3$, and $SrZrO_3$.

The dielectric ceramic composition according to the present invention has a dielectric constant of 33~44 and a multiplication value (Qxf$_o$) of a quality factor and resonant frequency of more than 27,000 GHz, so that it is possible to obtain a dielectric ceramic having a temperature coefficient of a resonant frequency ranged in $-10$ ppm/° C.~$+40$ ppm/° C.

In the above-described composition, the ratio between each composition and the amount of additives are limited for the following reasons. If $TiO_2$ is less than 25 wt %, the dielectric constant becomes too small, so that when $TiO_2$ exceeds 43 wt %, the temperature coefficient of the resonant frequency is increased to positive (+) value. In addition, if $ZrO_2$ and $SnO_2$ exceed 57 wt % and 28 wt %, respectively, or if $ZrO_2$ is less than 39 wt %, the temperature coefficient of the resonant frequency is increased to positive (+) value, so that when $SnO_2$ is less than 7 wt % the quality factor is greatly decreased. In addition, when the amount of additive of $BaCO_3$ exceeds 8 wt %, the quality factor is decreased, and the temperature coefficient of the resonant frequency is increased to negative ($-$) value, and when the amount of additive of $SrCO_3$ exceeds 8 wt %, the temperature coefficient of the resonant frequency is increased to positive (+)

value. In addition, if the amount of additive of $BaCO_3$ or $SrCO_3$ is less than 0.2 wt %, it is difficult to implement a sintering operation.

The examples of the present invention will be explained with reference to the accompanying drawings.

First, 25 dielectric ceramic samples are prepared, which are obtained by changing the compositions of high purity powders of $ZrO_2$, $SnO_2$, $TiO_2$, $BaCO_3$, and $SrCO_3$. The dielectric constant ($\epsilon_r$), a quality factor, a multiplication value ($Qxf_o$) and a temperature coefficient ($\tau_f$) of a resonant frequency with respect to the above-described samples is shown in the following table 1.

Sample

| No. | $TiO_2$ | $ZrO_2$ | $SnO_2$ | $BaCO_3$ | $SrCO_3$ | $\xi_r$ | $Qxf_0$ | $\tau_f$ |
|---|---|---|---|---|---|---|---|---|
| *1 | 48 | 44 | 8 | 0.5 | 0.5 | 46.3 | 48300 | +93 |
| 2 | 43 | 49 | 8 | 0.5 | 0.5 | 41.7 | 37400 | +24 |
| *3 | 42 | 36 | 22 | 0.5 | 0.5 | 37.8 | 40200 | +51 |
| 4 | 39 | 54 | 7 | 0.5 | 0.5 | 38.4 | 33500 | +21 |
| 5 | 38 | 47 | 15 | 0.5 | 0.5 | 37.7 | 47800 | 0 |
| 6 | 38 | 47 | 15 | 1.0 | 0.0 | 37.1 | 46600 | −1 |
| 7 | 38 | 47 | 15 | 0.0 | 1.0 | 38.3 | 45900 | +1 |
| 8 | 38 | 47 | 15 | 1.0 | 9.0 | 43.6 | 31000 | +42 |
| 9 | 38 | 41 | 21 | 0.5 | 0.5 | 36.2 | 53600 | −8 |
| 10 | 38 | 41 | 21 | 0.5 | 2.0 | 38.4 | 51300 | +1 |
| *11 | 38 | 41 | 21 | 9.0 | 1.0 | 33.4 | 22500 | −23 |
| 12 | 37 | 35 | 28 | 0.5 | 0.5 | 41.3 | 47800 | +32 |
| *13 | 37 | 28 | 35 | 0.5 | 0.5 | 45.7 | 23700 | +185 |
| *14 | 34 | 59 | 7 | 0.5 | 0.5 | 37.8 | 35100 | +36 |
| 15 | 34 | 52 | 14 | 0.5 | 0.5 | 35.6 | 41200 | +1 |
| 16 | 33 | 46 | 21 | 0.5 | 0.5 | 36.2 | 43100 | −7 |
| 17 | 33 | 40 | 27 | 0.5 | 0.5 | 35.6 | 41000 | +4 |
| *18 | 33 | 33 | 34 | 0.5 | 0.5 | 32.1 | 26300 | +78 |
| 19 | 29 | 57 | 14 | 0.5 | 0.5 | 34.7 | 37100 | +22 |
| 20 | 29 | 50 | 21 | 0.5 | 0.5 | 34.2 | 45200 | −4 |
| 21 | 29 | 44 | 27 | 0.5 | 0.5 | 34.1 | 42800 | −7 |
| *22 | 28 | 38 | 34 | 0.5 | 0.5 | 31.3 | 24600 | +41 |
| 23 | 25 | 55 | 20 | 0.5 | 0.5 | 33.5 | 27300 | +2 |
| 24 | 25 | 49 | 26 | 0.5 | 0.5 | 33.4 | 44500 | −8 |
| *25 | 21 | 53 | 26 | 0.5 | 0.5 | 32.8 | 36700 | −11 |

The method for fabricating the dielectric ceramic samples will be explained. The high purity powders of $ZrO_2$, $SnO_2$, $TiO_2$, $BaCO_3$, and $SrCO_3$ were weighed based on the composition ratios as shown in Table 1, mixed with a $ZrO_2$ ball and a deionized water in a plastic container and then ball-milled for 16 hours. The mixture obtained after the above-described ball-milling process was dehydrated, dried, and then processed based on a calcination for 2 hours at a temperature of 1150° C. Thereafter, the resultant mixture was added by a PVA, and then was ball-milled in the above-described manner. After the ball-milling process was performed, the cakes obtained through the dehydration and drying processes were powdered using a mortar and then were filtered using a 150 mesh screen for thereby obtaining a sintering powder sample. Continuously, the thusly obtained powder samples were molded under a pressure of 1000~2500 kg/cm² using a hydraulic press machine for thereby forming a cylindrical sample having a diameter of 12 mm and a height of 8 mm. The thusly obtained sample was sintered for 4 hours at a temperature of 1250~1400° C. in order to implement a fine dielectric ceramic, and the surface of the fine dielectric ceramic was polished.

Thereafter, a dielectric constant was measured with respect to the thusly obtained dielectric ceramic samples based on "Hakki-Coleman" method, and an unloaded quality factor was measured based on an open cavity method. In addition, the temperature coefficient of the resonant frequency was measured in a temperature range of −5° C. to 85° C. based on the resonant frequency at 25° C. using the following Equation 1.

$$\tau_t = \frac{f_{85} - f_{25}}{f_{25} \times \Delta T} \times 10^6 \ (\text{ppm}/^\circ\text{C.}) \qquad [\text{Equation 1}]$$

where $f_{85}$ and $f_{25}$ represent a resonant frequency at 85° C. and 25° C., $\Delta T$ represents a difference 60° C. between measured temperatures. As shown in Table 1, the samples indicated by * are dielectric compositions which are not in the ranges of the present invention. In this case, the dielectric constant is less than 33, and the multiplication of the resonant frequency and quality factor is less than 27,000 GHz, and the temperature coefficient of the resonant frequency is less than −10 ppm/° C. or larger than +40 ppm/° C.

Figure 2:
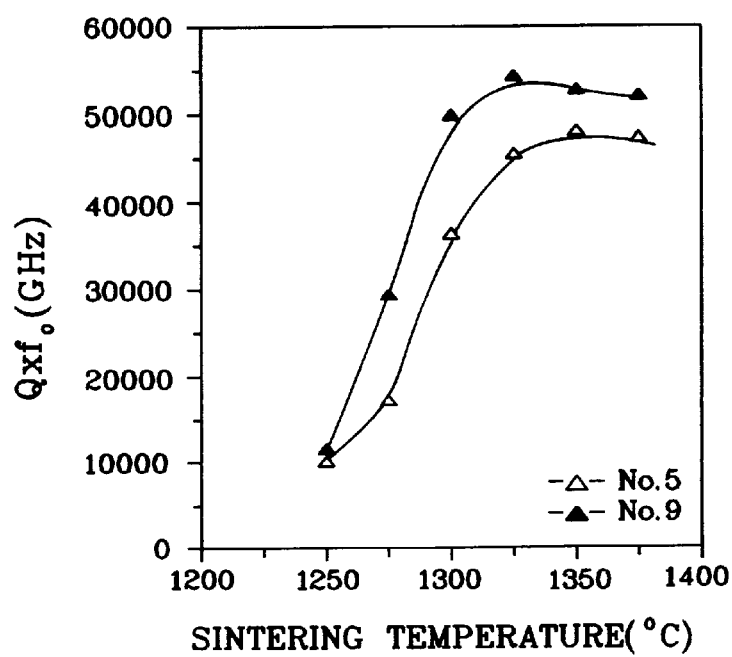
FIG. 2 is a graph illustrating a multiplication characteristic (Qxf$_o$) of a quality factor and a resonant frequency according to a sintering temperature with respect to a composition according to the present invention.

FIG. 1 illustrates a dielectric characteristic based on a sintering temperature with respect to a composition according to the present invention, and FIG. 2 illustrates a multiplication characteristic ($Qxf_o$) of a resonant frequency and a quality factor according to a sintering temperature with respect to a composition according to the present invention.

As described above, it is possible to obtain a dielectric ceramic having a dielectric constant of 33~44, more than 27,000 GHz of a multiplication ($Qxf_o$) of a quality factor and resonant frequency, and −10 ppm/° C.~+40 ppm/° C. of a temperature coefficient of a resonsnt frequency based on a sintering operation performed at a temperature of 1250~1400° C. using the dielectric ceramic composition which is produced by adding more than one selected from $BaCO_3$ and $SrCO_3$ to the composition formed of 25~43 wt % of $TiO_2$, 39~57 wt % of $ZrO_2$, and 4~28 wt % of $SnO_2$ by 0.2~8.0 wt %. In addition, $BaCO_3$ may be substituted with $BaTiO_3$ or $BaZrO_3$, and $SrCO_3$ may be substituted with $SrTiO_3$ or $SrZrO_3$.

The ceramic produced using a composition according to the present invention has a high dielectric constant and quality factor, and it is possible to control the temperature coefficient of a resonant frequency by controlling the ratio of a composition, the type of an additive, and the amount of additives, so that the composition according to the present invention is applicable to an antenna or microwave circuit used in a band pass filter or a microwave region and has an advantage for decreasing the sintering temperature compared to the conventional art.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A dielectric ceramic composition which is fabricated by adding one selected from a material containing Ba and a material containing Sr or a mixture of a material (containing Ba and a material containing Sr to a composition formed of 25~43 wt % of $TiO_2$, 39~57 wt % of $ZrO_2$, and 7~28 wt % of $SnO_2$ as an additive, wherein the additive is added by 0.2~8.0 wt % based on the total amount of the composition.

2. The composition of claim 1, wherein said material containing Ba is one selected from $BaCO_3$, $BaTiO_3$, and $BaZrO_3$, and said material containing Sr is one selected from $SrCO_3$, $SrTiO_3$, and $SrZrO_3$.

* * * * *